No. 662,781. Patented Nov. 27, 1900.
W. H. FAUBER.
BICYCLE CRANK HANGER.
(Application filed Aug. 5, 1899.)
(No Model.)
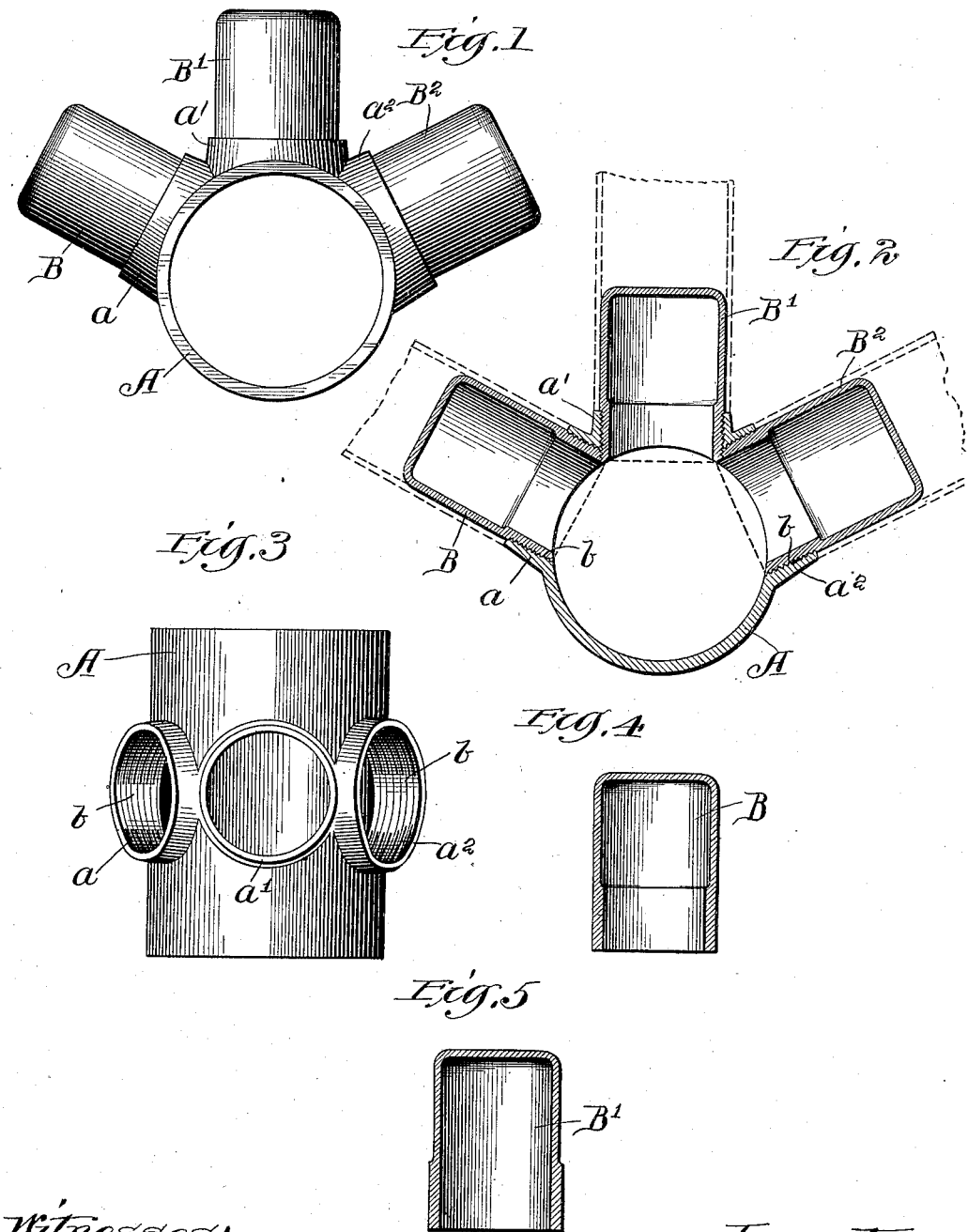

UNITED STATES PATENT OFFICE.

WILLIAM H. FAUBER, OF CHICAGO, ILLINOIS.

BICYCLE CRANK-HANGER.

SPECIFICATION forming part of Letters Patent No. 662,781, dated November 27, 1900.

Application filed August 5, 1899. Serial No. 726,272. (No model.)

*To all whom it may concern:*

Be it known that I, WILLIAM H. FAUBER, of Chicago, in the county of Cook and State of Illinois, have invented certain new and useful Improvements in Bicycle Crank-Hangers; and I do hereby declare that the following is a full, clear, and exact description thereof, reference being had to the accompanying drawings, and to the letters of reference marked thereon, which form a part of this specification.

This invention relates to an improved construction in bicycle crank-hangers, and more especially in means for connecting the frame-bars of a bicycle with the hanger-sleeve or transverse tubular part which is attached to the bicycle frame-bars and in which the crank-shaft bearings are supported.

The invention consists in the matters hereinafter described, and pointed out in the appended claims.

As shown in the drawings, Figure 1 is a side elevation of a hanger-sleeve embodying my invention. Fig. 2 is a view of the same in central vertical section, taken through the thimbles or lugs by means of which the frame members are attached to the said sleeve. Fig. 3 is a plan view of the hanger-sleeve. Figs. 4 and 5 are vertical sections of one of the blanks for the thimbles or lugs, showing the same in two stages of its manufacture.

As shown in the accompanying drawings, A indicates the main tubular part or sleeve, which constitutes the body of the bracket, and B B' B² attached tubular projections or thimbles adapted for the attachment of the three frame members of a bicycle-frame—namely, the lower front frame-bar, seat-post frame-bar, and rear-fork frame-bar. The sleeve A is adapted to receive the bearing rings or cups of a ball-bearing and to support the same in proper position with respect to each other and the bearing members upon the crank-shaft which is inserted through said sleeve, the sleeve A being provided with the usual internal screw-threads for engagement with corresponding screw-threads of the bearing members or otherwise adapted to receive and hold the external bearing members of the crank-shaft bearings, as may be desired or preferred. The main tubular part or sleeve A is provided with a plurality of radial integral tubular projections or flanges corresponding in angular position with the thimbles, which latter are inclined at suitable angles for engagement with the frame bars or members which are to be connected with the hanger-sleeve and over which the ends of said frame members are fitted. In the instance illustrated three of said flanges $a$ $a'$ $a^2$ are shown as arranged with their central axes in a vertical plane perpendicular to the central axis of the sleeve. The said annular flanges are each provided with internal screw-threads and are adapted to be engaged with the inner ends of the thimbles B B' B², which are provided with external screw-threads engaging those in said flanges. The thimbles are connected with the sleeve by engagement of their screw-threaded parts $b$ with said flanges, the entire article formed by the connected sleeve and thimbles constituting a complete article, known as a "hanger" or "hanger-sleeve," such as is ordinarily sold in the trade and is adapted for insertion in or use as part of a bicycle-frame. The thimbles after being connected with the sleeve by screw-threaded connections described will be permanently secured thereto by brazing or like means, the brazing of the thimbles to the sleeve being done either before or at the time the frame members are fitted over and brazed to said thimbles. The flanges $a$ $a'$ $a^2$ being usually so close together that the inner ends of the thimbles when inserted in the sleeve will interfere with each other, the thimble or thimbles first inserted will usually be cut away by a reamer to allow the insertion of the other thimble or thimbles. As shown in the drawings, the inner ends of the external thimbles $a$ $a^2$ are cut away at their edges adjacent to their intermediate thimble $a'$ to admit of the insertion of the latter. The said thimbles B B' B² are preferably constructed of sheet metal by a drawing or swaging operation and provided each with an integral closed outer end or wall which tends to prevent the collapsing or crushing of the thimble, and thereby greatly stiffens and strengthens the same. As a further improvement the inner or screw-threaded parts $b$ of the walls of the thimble are made thicker to an extent equal to or greater than the depth of the screw-threads formed thereon than the parts thereof which extend beyond or outside of the flanges of the sleeve. Such thickening of the walls of the thimbles prevents the weakening of the same in the cutting of the screw-threads. Such increased thickness of the walls of the thimbles extends outwardly to the point slightly beyond the screw-threads therein, so that when the thimbles are attached to the sleeve the thickened parts will extend past the outer edges of the flanges, thereby forming a reinforcement tending to resist lateral strains and adding greatly to the strength and stiffness of the thimbles. The said thimbles are preferably made cylindric on their outer surfaces or of uniform external diameter and the additional thickness is provided by making the interior diameter of the thimbles at their inner greater than at their outer or closed ends, as clearly indicated in Figs. 2 and 4. This construction is especially adapted for hanger-sleeves to be used with the frames having flush joints, it being obvious that when the thimbles having the cylindric exterior surface are screwed into the flanges on the sleeve and square shoulders are formed at the outer ends of said flanges the ends of the frame members will abut against the said shoulders when fitted over the thimbles, as clearly indicated in dotted lines in Fig. 2. Usually the outer ends of said flanges will be made to correspond in thickness with the thickness of the frame-tubing, so as to give a smooth or flush finish between the flanges and frame-tubing.

The method of constructing the drawn or swaged thimbles with thickened ends is illustrated in Figs. 4 and 5. In constructing the thimbles they will first be drawn or swaged in the form shown in Fig. 5 with a cylindric interior surface and an external wide projection which forms the thickened inner end of the thimble. A thimble may be easily made in this shape by the use of a drawing punch and die. The thimble thus made may then be forced through the aperture of a drawing-die and the thickened or reinforced part thrust inwardly, while its outer surface is given a cylindric form, as shown in Fig. 4.

Radial thimbles or lugs of the general form shown have been heretofore made integral with the hanger-sleeve by a drawing or swaging operation; but a great disadvantage is encountered in so constructing the hanger-sleeve from the fact that the sleeve when made of the usual thickness does not furnish a sufficient amount of metal to make a thimble of the length and stiffness required for the proper attachment of the frame members to the sleeve. By making the thimbles separate from the sleeve, providing the sleeve with short integral outwardly-projecting tubular parts or flanges, and providing a screw-threaded connection between the said thimbles and flanges a construction is provided which is stronger and more reliable than that afforded by an integral thimble or thimbles which are brazed to the sleeve without the use of screw-joints. Obviously, after the thimbles have been inserted into the flanges and united thereto by brazing together the screw-threaded surfaces of the parts the sleeve produced possesses a strength practically equal to that of a one-piece hanger. It being the usual practice to braze the thimbles to the sleeve at the same time that the sleeve is joined to the frame members, it is desirable that the thimbles should be held accurately in proper relation to the sleeve during the brazing operation. This result is perfectly attained by the screw-threaded connection described, which renders the use of temporary rivets or wiring entirely unnecessary, while producing more certain and more satisfactory results. It will of course be understood that the spelter used in brazing will readily find its way between the screw-threaded surfaces of the thimbles and flanges and form a perfect union between said parts.

An important part of my invention is embraced in the construction by which the inner ends of the thimbles on which the screw-threads are formed are made thicker than other parts, for the reason that this gives a suitably-strong construction without increasing the weight of the thimbles. Another important feature of my invention is embraced in the construction in which the thimbles made separate from the hanger-sleeve and of tubular form, are closed at their outer ends by means of integral end walls, said end walls serving to prevent the crushing of the thimbles, and thereby giving greater strength to the same.

I claim as my invention—

1. A crank-hanger comprising a hanger-sleeve provided with short integral annular flanges provided with interior screw-threads, and thimbles, the outer parts of which are smooth and cylindric to enter the ends of frame-tubes, and the inner parts of which enter said flanges and are screw-threaded to engage the same, the outer smooth parts of the thimbles being longer than the inner screw-threaded parts and smaller in diameter than the external diameter of the flanges, and the said inner screw-threaded ends of the thimbles being contained within and entirely covered by the flanges and being secured to the flanges by brazing.

2. A crank-hanger comprising a hanger-sleeve provided with short integral annular flanges provided with interior screw-threads, and thimbles, the outer parts of which are smooth and cylindric to enter the ends of frame-tubes, and the inner parts of which enter the flanges and are screw-threaded to engage the same, said screw-threaded parts of the thimbles being made of a diameter no greater than that of the smooth parts thereof, the outer smooth parts of the thimbles being longer than the inner screw-threaded parts and smaller in diameter than the external diameter of the flanges, and the said inner screw-threaded ends of the thimbles being contained within and entirely covered by the flanges and being secured to the flanges by brazing.

3. A crank-hanger comprising a hanger-sleeve provided with short integral annular flanges provided with interior screw-threads, and thimbles, the outer parts of which are smooth and cylindric to enter the ends of frame-tubes and the inner parts of which enter the flanges and are screw-threaded to engage the same, the walls of the parts of the thimbles containing the threads being made of greater thickness than the walls of the other parts thereof, the outer smooth parts of the thimbles being longer than the inner screw-threaded parts and smaller in diameter than the external diameter of the flanges, and the said inner screw-threaded ends of the thimbles being contained within and entirely covered by the flanges and secured to the flanges by brazing.

In testimony that I claim the foregoing as my invention I affix my signature, in presence of two witnesses, this 3d day of August, A. D. 1899.

WILLIAM H. FAUBER.

Witnesses:
C. CLARENCE POOLE,
WILLIAM L. HALL.